(12) United States Patent
Matsumura

(10) Patent No.: US 6,762,792 B1
(45) Date of Patent: Jul. 13, 2004

(54) DIGITAL STILL CAMERA

(75) Inventor: Hideki Matsumura, Kyoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/085,171

(22) Filed: May 28, 1998

(30) Foreign Application Priority Data

May 30, 1997 (JP) .............................. 9-141304

(51) Int. Cl.[7] .......................................... H04N 5/262
(52) U.S. Cl. ................................................. 348/240.2
(58) Field of Search ..................... 348/240.99, 231.99, 348/222.1, 581, 538, 240.1, 240.2

(56) References Cited

U.S. PATENT DOCUMENTS

| | | | | |
|---|---|---|---|---|
| 4,774,581 A | * | 9/1988 | Shiratsuchi | 348/561 |
| 4,963,981 A | * | 10/1990 | Todaka et al. | 348/240.2 |
| 5,243,433 A | * | 9/1993 | Hailey | 348/240 |
| 5,333,055 A | * | 7/1994 | Murata et al. | 348/240 |
| 5,402,171 A | * | 3/1995 | Tagami et al. | 348/279 |
| 5,739,867 A | * | 4/1998 | Eglit | 348/581 |
| 5,850,487 A | * | 12/1998 | Takane et al. | 348/240 |
| 5,966,171 A | * | 10/1999 | Hieda | 348/240 |
| 6,157,408 A | * | 12/2000 | Etoh | 348/316 |

FOREIGN PATENT DOCUMENTS

| | | |
|---|---|---|
| JP | 06-311426 | 11/1994 |
| JP | 07-046459 | 2/1995 |
| JP | 07-177408 | 7/1995 |

* cited by examiner

Primary Examiner—Wendy R. Garber
Assistant Examiner—Jason Whipkey
(74) Attorney, Agent, or Firm—Westerman, Hattori, Daniels & Adrian, LLP

(57) ABSTRACT

A digital still camera includes a DRAM so that the DRAM is stored with pixel data having a Y, U or V component. A memory control circuit reads the pixel data out of the DRAM at a clock rate of 30 MHz, and writes it to SRAM. The memory control circuit then reads out the pixel data, that has been written from the SRAM to a first register, at a clock rate of 15 MHz and at a desired zoom magnification. An H/V interpolating circuit performs vertical interpolation and horizontal interpolation based on the data read out, and creates a zoom pixel. Since two pixels in a vertical direction is required to create one zoom pixel, the SRAM is formed with 2 lines of a memory area. Also, since only 1 line of data can read out of the DRAM at one time, the memory control circuit reads out the pixel data at a clock rate 2 times the value 15 MHz, i.e. 30 MHz.

12 Claims, 13 Drawing Sheets

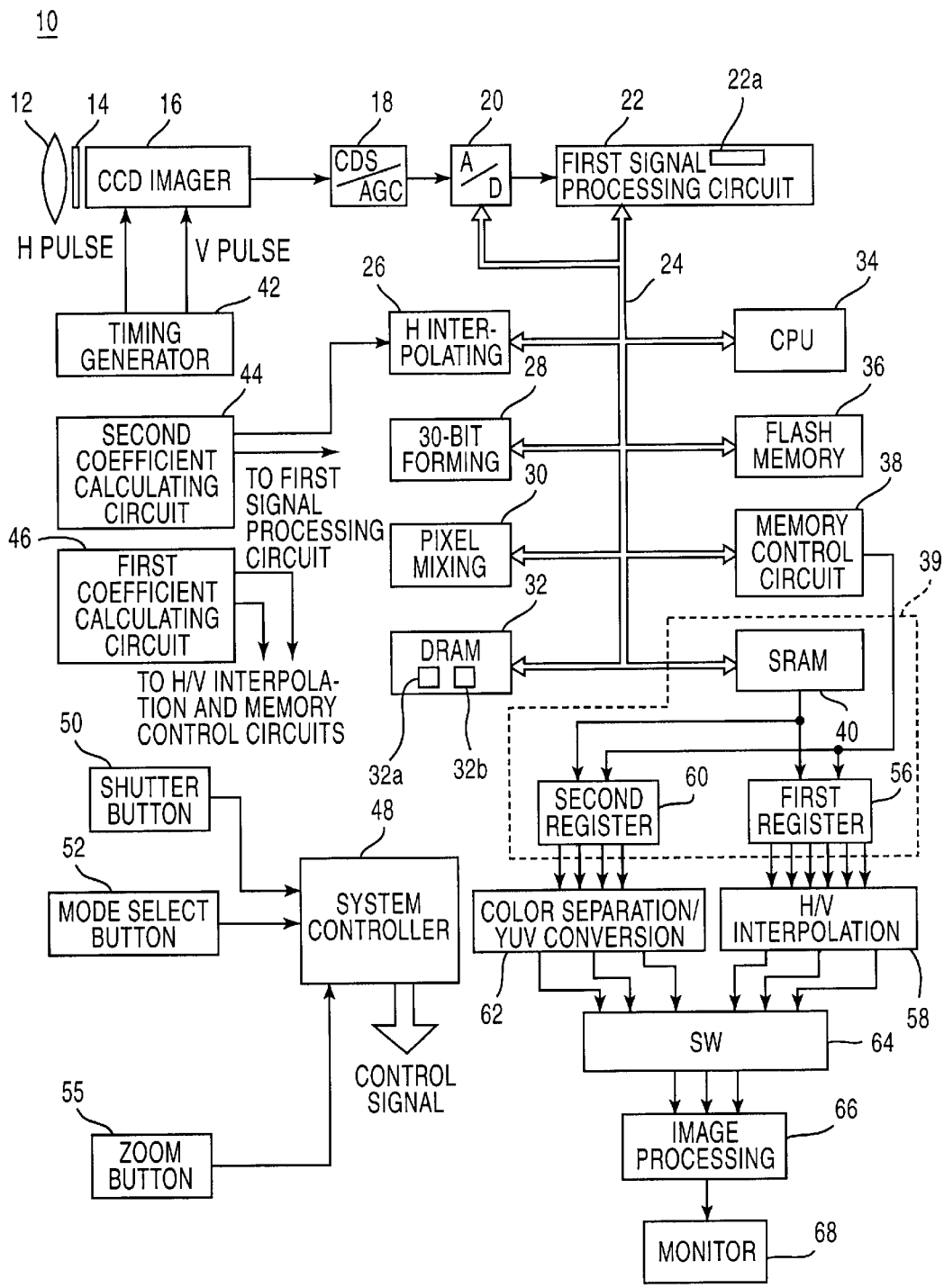

FIG. 2

| Cy | Ye | Cy | Ye | Cy | | | Ye | Cy | Ye |
|----|----|----|----|----|---|---|----|----|----|
| Mg | G | Mg | G | Mg | | | G | Mg | G |
| Cy | Ye | Cy | Ye | Cy | | | Ye | Cy | Ye |
| G | Mg | G | Mg | G | | | Mg | G | Mg |
| | | | | | | | | | |
| Mg | G | Mg | G | Mg | | | G | Mg | G |
| Cy | Ye | Cy | Ye | Cy | | | Ye | Cy | Ye |

FIG. 3

| Cy | Ye | Cy | Ye | ... |
|----|----|----|----|-----|
| Mg | G | Mg | G | ... |
| Cy | Ye | Cy | Ye | ... |
| G | Mg | G | Mg | ... |
| : | : | : | : | |

FIG. 8

| | VERTICAL DIRECTION → | | | | | |
|---|---|---|---|---|---|---|
| V ZOOMING COEFFICIENT : 0.8 | | | | | | |
| PIXEL DATA | ● | ● | ● | ● | ● | |
| | ○ | ○ | ○ | ○ | ○ | ○ |
| V CUMULATIVE ZOOMING COEFFICIENT | 0.0 | 0.8 | 1.6 | 2.4 | 3.2 | 4.0 |
| DIFFERENCE IN INTEGER PORTION | — | 0 | 1 | 1 | 1 | 1 |
| DECIMAL PORTION | 0.0 | 0.8 | 0.6 | 0.4 | 0.2 | 0.0 |

FIG. 9

| | HORIZONTAL DIRECTION → | | | | | | | | | | |
|---|---|---|---|---|---|---|---|---|---|---|---|
| H ZOOMING COEFFICIENT : 0.4 | | | | | | | | | | | |
| PIXEL DATA | ● | | ● | | ● | | ● | | ● | | |
| | ○ | ○ | ○ | ○ | ○ | ○ | ○ | ○ | ○ | ○ | ○ |
| H CUMULATIVE ZOOMING COEFFICIENT | 0.0 | 0.4 | 0.8 | 1.2 | 1.6 | 2.0 | 2.4 | 2.8 | 3.2 | 3.6 | 4.0 |
| DIFFERENCE IN INTEGER PORTION | — | 0 | 0 | 1 | 0 | 1 | 0 | 0 | 1 | 0 | 1 |
| DECIMAL PORTION | 0.0 | 0.4 | 0.8 | 0.2 | 0.6 | 0.0 | 0.4 | 0.8 | 0.2 | 0.6 | 0.0 |

F I G. 1 0
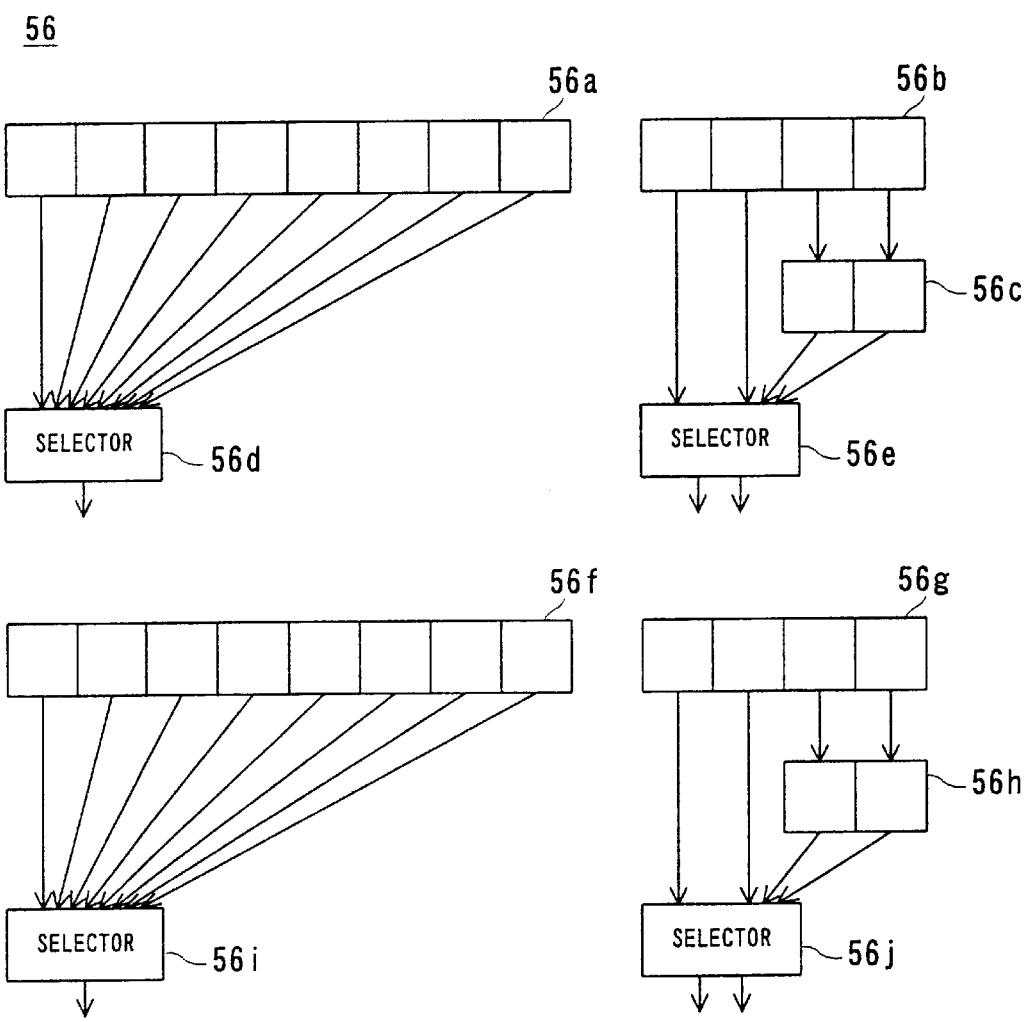

FIG. 11
(A)
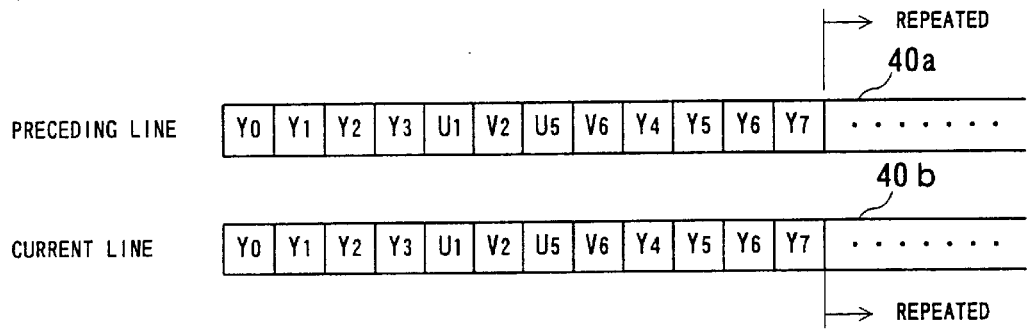
(B)
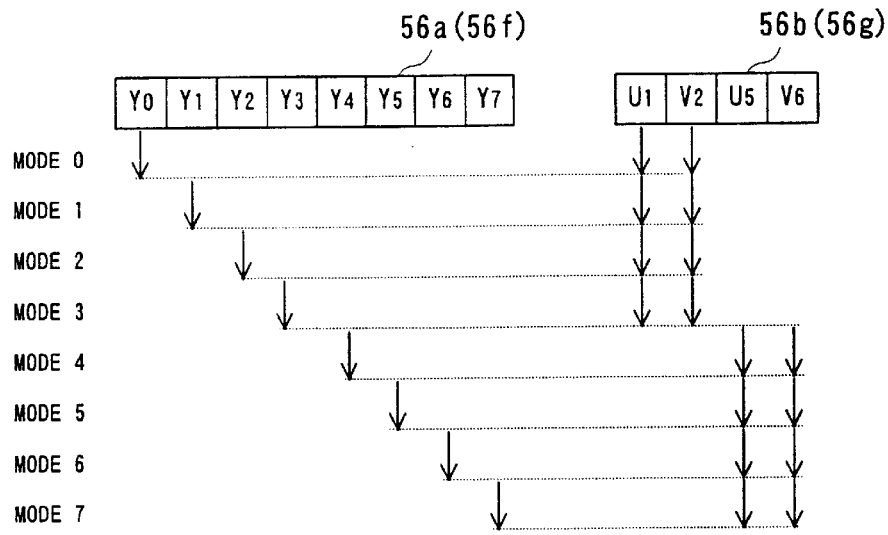
(C)
|  | 0 | 1 | 2 | 3 | 4 | 5 | 6 | 7 |
|---|---|---|---|---|---|---|---|---|
| PRECEDING LINE | Y0 | Y1 | Y2 | Y3 | Y4 | Y5 | Y6 | Y7 |
|  | U1 | U1 | U1 | U1 | U5 | U5 | U5 | U5 |
|  | V2 | V2 | V2 | V2 | V6 | V6 | V6 | V6 |
| | | | | | | | | |
|---|---|---|---|---|---|---|---|---|
| CURRENT LINE | Y0 | Y1 | Y2 | Y3 | Y4 | Y5 | Y6 | Y7 |
|  | U1 | U1 | U1 | U1 | U5 | U5 | U5 | U5 |
|  | V2 | V2 | V2 | V2 | V6 | V6 | V6 | V6 |

F I G. 1 3

FIG. 14
(A)
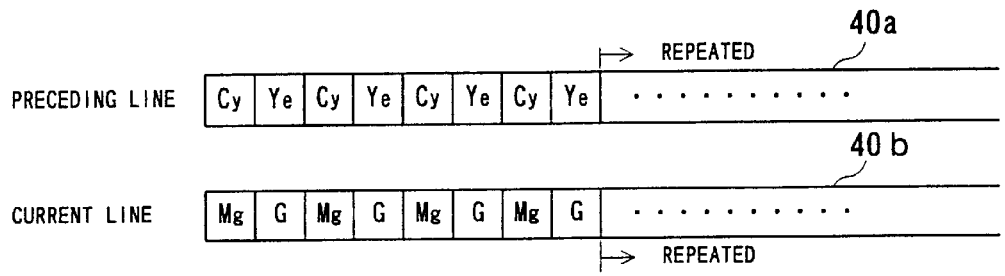
(B)
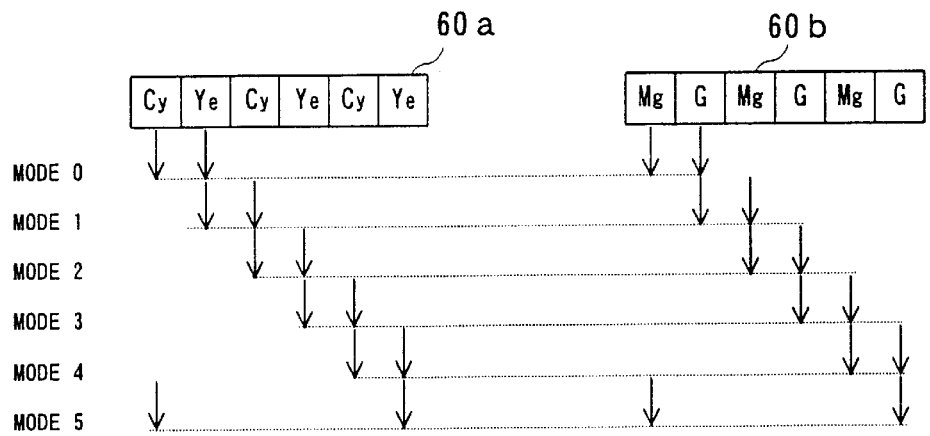
(C)
|    | 0  | 1  | 2  | 3  | 4  | 5  | 6  | 7  |
|----|----|----|----|----|----|----|----|----|
|    | Cy | Cy | Cy | Cy | Cy | Cy | Cy | Cy |
|    | Ye | Ye | Ye | Ye | Ye | Ye | Ye | Ye |
|    | Mg | Mg | Mg | Mg | Mg | Mg | Mg | Mg |
|    | G  | G  | G  | G  | G  | G  | G  | G  |

DIGITAL STILL CAMERA

BACKGROUND OF THE INVENTION

1. Field of the Invention

This invention relates to digital still cameras, and more particularly to a digital still camera adapted to create zoom image data having a desired zooming magnification depending upon image data held in a video memory and having pixels each having a single image-quality-related element.

2. Description of the Prior Art

In a conventional digital still camera 1 of this kind as shown in FIG. 19, the pixel data of a preceding line, held in a DRAM 2, is temporarily stored into a line memory 3 so that the pixel data of the preceding line and the pixel data of the current line are supplied simultaneously to an interpolating circuit 4. Accordingly, the interpolating circuit 4 performs vertical interpolation based on two pixel data in a vertical direction. The interpolating circuit 4 also includes registers 4a and 4b to hold the preceding-line pixel data in a horizontal direction, and performs horizontal interpolation based on the preceding pixel data and the current pixel data that are simultaneously obtained on each line. Due to this, desired zoom image data is obtainable by the interpolating circuit 4.

In such a prior art, however, a line memory 3 is required to have a memory capacity of 1 line in order to create zoom image data, thus raising a problem of increasing the scale of a circuit.

SUMMARY OF THE INVENTION

Therefore, it is a primary object of this invention to provide a digital still camera which is capable of obtaining desired zoom image data while small in memory capacity.

This invention is a digital camera structured to create zoom image data having a desired zoom magnification, comprising: a video memory for holding source image data; a buffer having at least a first capacity corresponding to a data amount of a particular source pixel required to create one zoom pixel; a reading/writing means for reading out of the video memory, and writing into the buffer, pixel data containing the particular pixel at a predetermined clock rate of a reference clock rate multiplied by the number of vertical pixels or more of the particular source pixel; a reading means for reading the pixel data held in the buffer at the reference clock rate; and a creating means for creating pixel data for the zoom pixel based on an output of the buffer.

The buffer has at least a first capacity corresponding to a data amount of a particular source pixel required to create one zoom pixel. The reading/writing means reads the pixel data including a particular source pixel out of the video memory at a predetermined clock rate of a reference clock rate multiplied by the number of vertical pixels or more of the particular source pixel, and write it into the buffer as this. When writing is completed, the reading means reads out the pixel data held in the buffer at the reference clock rate. Then, the creating means creates pixel data for a zoom pixel based on the pixel data outputted from the buffer.

In one aspect of this invention, a first summing means sums up vertical zooming coefficients related to the zoom magnification. A first determining means included in the reading/writing means determines a readout position in the vertical direction of the video memory based on a first summing result by the first summing means.

In one embodiment of this invention, a first determining means extracts a first integer from the first summing result, detects a first difference between the first integer extracted in a previous time and the first integer extracted this time, and renewing the readout position in the vertical direction depending upon the first difference.

In another aspect of this invention, the buffer includes an SRAM having at least a first capacity and accessed on a word-by-word basis, a register for holding predetermined words of pixel data read out of the SRAM. The register is written by the predetermined words of pixel data including the particular source pixel, while the reading means reads the pixel data contained in the vertical direction of the particular source pixel out of the register.

According to another embodiment of this invention, horizontal zooming coefficients related to the zoom magnification are summed up by a second summing means so that the reading means determines a readout position of the register based on a second summing result by the second summing means. That is, the second determining means extracts a second integer from the second summing result, detects a second difference between the second integer extracted at a preceding time and the second integer extracted this time, and renewing the readout position of the register depending upon the second difference.

According to this invention, the pixel data containing a particular source pixel is written into the buffer at a predetermined clock rate of the reference clock rate multiplied by the number of vertical pixels or more of the particular source pixel so that the pixel data held in the buffer is read out at the reference clock rate. Therefore, it is possible to create desired zoom image data while reducing the buffer capacity.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing one embodiment of this invention;

FIG. 2 is an illustrative view showing a color filter;

FIG. 3 is an illustrative view showing an operation of color separation;

FIG. 8 is an illustrative view showing an operation of the first coefficient calculating circuit;

FIG. 9 is an illustrative view showing another part of the operation of the first coefficient calculating circuit;

FIG. 10 is a block diagram of a first register;

FIG. 11 is an illustrative view showing an operation of the SRAM and the first register;

FIG. 13 is an illustrative view showing an operation of a 30-bit forming circuit 28;

FIG. 14 is an illustrative view showing an operation of the SRAM and a second register;

DETAILED DESCRIPTION OF THE PREFERRED EMBODIMENTS

Figure 1:
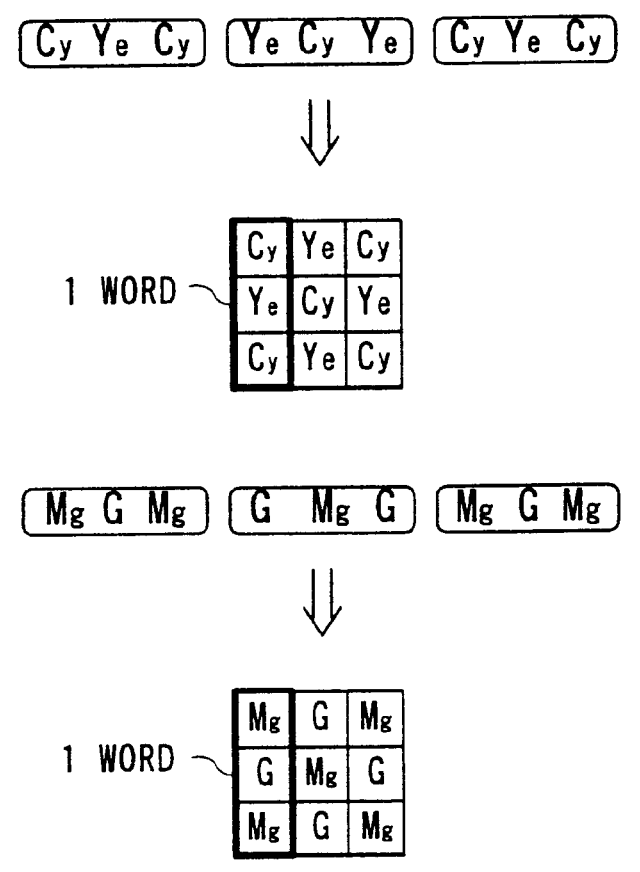
Figure 4:
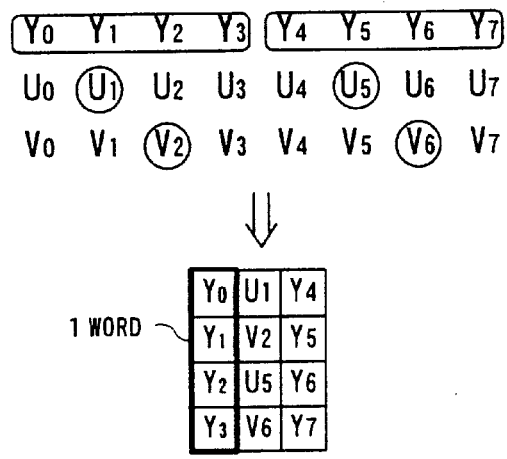
FIG. 4 is an illustrative view showing an operation of a pixel-mixing circuit.

Referring to FIG. 1, a digital still camera 10 of this embodiment includes a lens 12. An optical image incident on this lens 12 is given to a CCD imager 16 through a color filter 14 having $C_y$, $Y_e$, $M_g$, and G arranged in a mosaic form, as shown in FIG. 2.

When outputting a motion picture on a monitor 68, the CCD imager 16 outputs 2 lines of pixel signals at a same time, according to a vertical drive pulse and a horizontal drive pulse given from a timing generator 42. Specifically, the CCD imager 16 performs so-called pixel mixing readout to simultaneously output continuous 2 lines of pixel signals from an odd line. The 2-line pixel signal is supplied to a CDS/AGC circuit 18. The CDS/AGC circuit 18 performs well-known noise removal and level adjustment on the inputted pixel signal. The pixel signal processed by this CDS/AGC circuit 18 is converted into digital data, i.e. pixel data, by an A/D converter 20. A first signal processing circuit 22 receives the pixel data outputted from the A/D converter 20 to calculate luminance data (Y data) and color-difference data (U data and V data), as explained below. To create Y data, the pixel data inputted is averaged according to Equation 1.

[Equation 1]

For a line (H1 + H2)
$$Y = \{(Mg + Ye) + (G + Cy)\}/2$$
$$= \{(R + B + R + G) + (G + B + G)\}/2$$
$$= (2R + 3G + 2B)/2$$
For a line (H3 + H4)
$$Y = \{(G + Ye) + (Mg + Cy)\}/2$$
$$= \{(G + G + R) + (R + B + B + G)\}/2$$
$$= (2R + 3G + 2B)/2$$
provided that $Mg = R + B$, $Ye = R + G$ and $Cy = B + G$ Since the Y data is proportional to 2R+3G+2B, a B component would be produced brighter than the Y data (=0.3R+0.59G+0.11B) specified by an NTSC standard. This, however, raises no practical problem.

To create U data and V data, on the other hand, the first signal processing circuit 22 performs subtraction between adjacent pixels, according to Equation 2.

[Equation 2]

For a line (H1 + H2)
$$U = \{(Mg + Ye) - (G + Cy)\}$$
$$= \{(R + B + R + G) - (G + B + G)\}$$
$$= 2R - G$$
For a line (H3 + H4)
$$V = \{(G + Ye) - (Mg + Cy)\}$$
$$= \{(G + G + R) + (R + B + B + G)\}$$
$$= G - 2B$$
provided that $Mg = R + B$, $Ye = R + G$ and $Cy = B + G$ However, since the color difference data is available only every other line, the first signal processing circuit 22 supplements color difference data that is absent on a current line by using the color difference data of the preceding line. That is, for a line (H3+H4), only V data is available so that the (H1+H2)-line U data is utilized for (H3+H4)-line U data.

This provides Y, U and V data for the positions as shown by black dots in FIG. 3.

The Y, U and V data thus produced is inputted to a pixel mixing circuit 30 via a 32-bit bus 24. The pixel mixing circuit 30 makes sampling on the inputted Y, U and V data at a ratio of 4:1:1 to configure the sampled data into a 1-word unit. Considering horizontally-continuous 8 pixels of Y, U and V with reference to FIG. 4, 1-word data is formed by continuous 4-pixels of Y data without thinning out the Y data. That is, $Y_0$–$Y_3$ forms one 1-word data, while $Y_4$–$Y_7$ forms another 1-word data. On the other hand, the U data, excepting $U_1$ and $U_5$, is thinned out, while the V data, excepting $V_2$ and $V_6$, is thinned out. Thus, $U_1$, $U_5$, $V_2$ and $V_6$ form 1-word data. Each of the Y, U and V data has a data amount of 8 bits. Accordingly, a 1-word corresponds to 32 bits. Thus, the 8 pixels of the Y, U and V data are configured into 3 words by the above-stated 4:1:1 conversion.

The Y, U and V data thus arranged word by word are stored in a memory area 32a of a DRAM 32 through an SRAM 40 included in a buffer 39. More specifically, the SRAM 40 has two memory areas 40a and 40b each having a memory capacity of 96 pixels, as shown in FIG. 6. In the memory area 40a is temporarily held the data created in the pixel mixing circuit 30 by the memory control circuit 38. The memory control circuit 38 writes 30-word data into a memory area 32a, shown in FIG. 5, at intervals of readout operation of the DRAM 32, each time 30 words, i.e. 80-pixel data are held.

Figure 5:
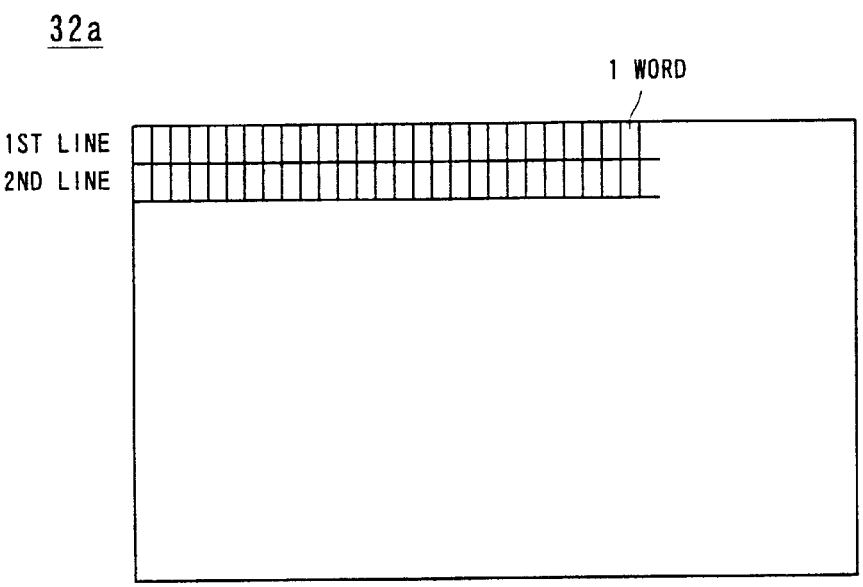
FIG. 5 is an illustrative view showing memory areas in a DRAM.
Figure 6:
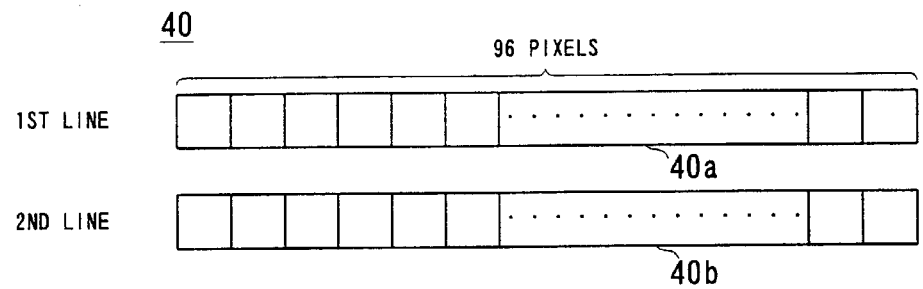
FIG. 6 is an illustrative view showing an SRAM.

As understood from FIG. 4, the Y, U and V data continuing in the horizontal direction are vertically rearranged by the pixel mixing circuit 30 so that 1-word has a vertical length corresponding to a 1-line width of the memory area 32a shown in FIG. 5. When the writing of 1 frame of the Y, U and V data to the memory area 32a is completed, the memory control circuit 38 specifies 2 lines of the Y, U and V data to be read out of the memory area 32a depending upon a V accumulative zooming coefficient calculated by a first coefficient calculating circuit 46.

Figure 7:
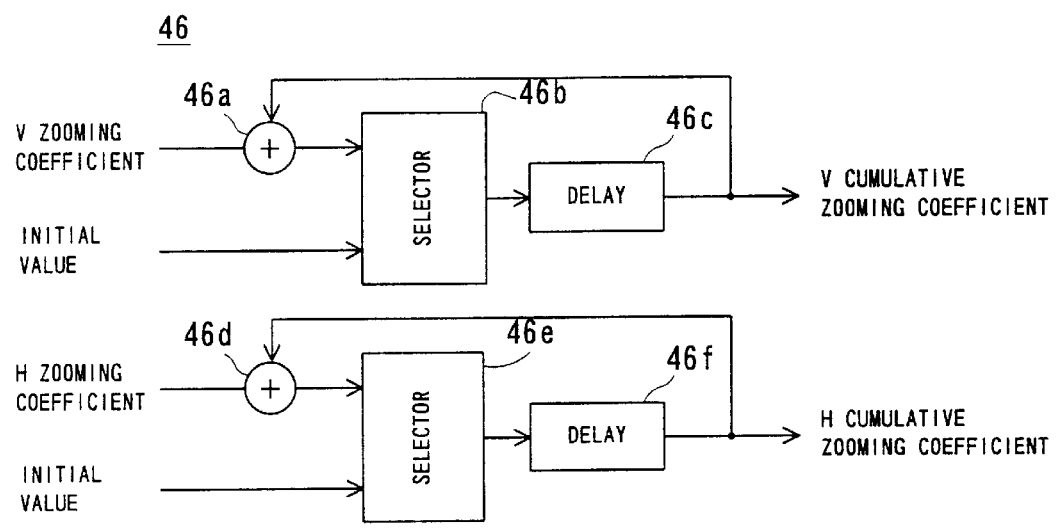
FIG. 7 is a block diagram showing a first coefficient calculating circuit.
Figure 12:
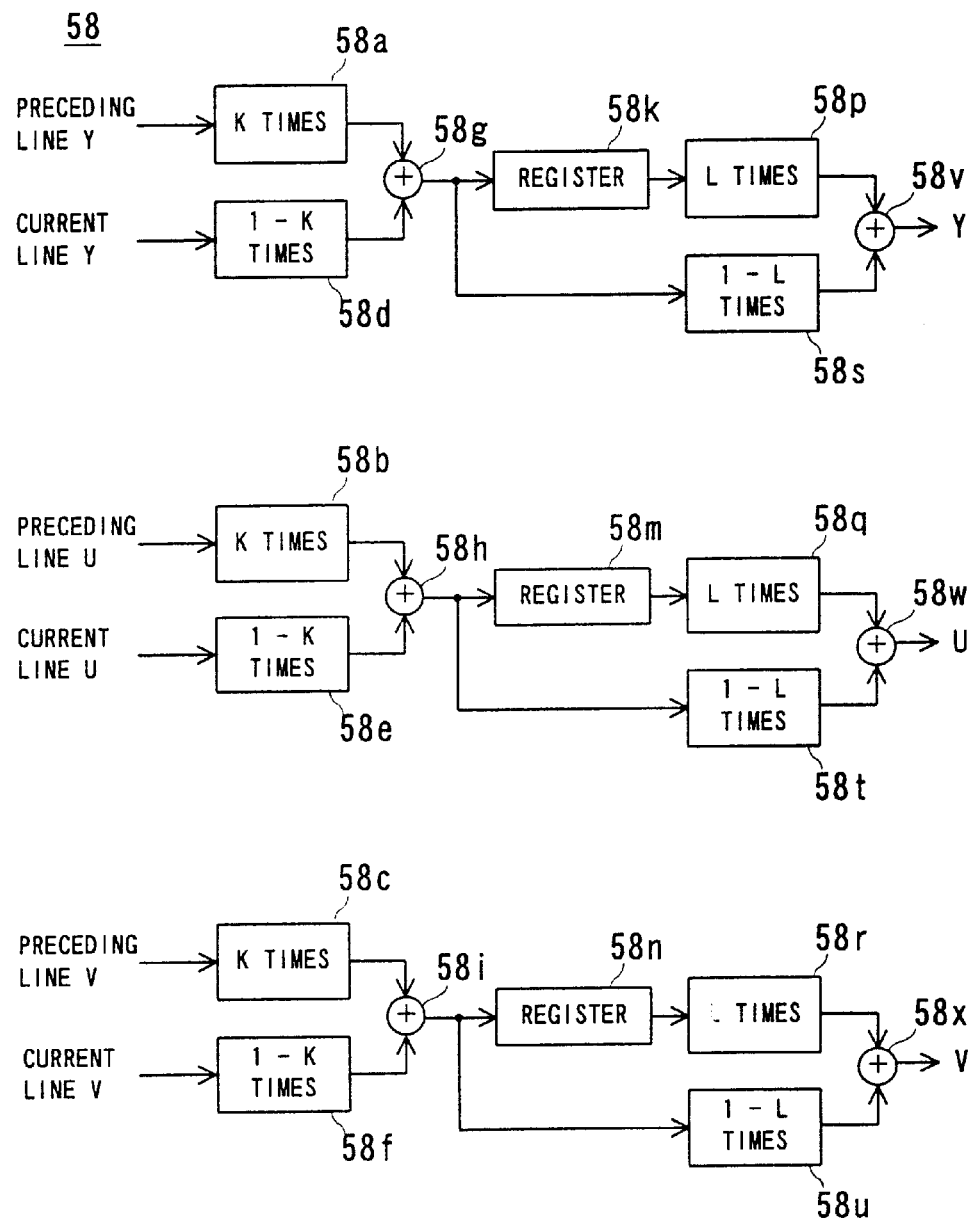
FIG. 12 is a block diagram showing an H/V interpolating circuit.

The first coefficient calculating circuit 46 makes a calculation of a V accumulative zooming coefficient based on a V zooming coefficient outputted from a system controller 48, as described hereinbelow. If an operator manipulates a zoom button 55 to set a zooming magnification, for example, of "2.5", an H zooming coefficient becomes "0.4" that is, a reciprocal number to "2.5". On the other hand, the V zooming coefficient becomes "0.8" that is twice the H zooming coefficient, because zoom image data is outputted on a monitor 68 by an interlace-method. The system controller 48 supplies the V zooming coefficient "0.8" to an adder 46a included in the first coefficient calculating circuit 46, as shown in FIG. 7, wherein an initial value "0.0" is given to a selector 46b at an odd field while an initial value "0.4" that is a half of the V zooming coefficient given thereto at an even field. The selector 46b selects only at a beginning the initial value at predetermined timing conforming to the V zooming efficient, and selects an output of the adder 46a during a period excepting that timing. An output of the selector 46b is delayed by a period corresponding to the V zooming coefficient by a delaying circuit 46c, and then supplied as a V accumulative zooming coefficient to the memory control circuit 38 while it is fed back to the adder 46a.

For an odd field having a V zooming coefficient of "0.8", the V accumulative zooming coefficient varies as "0.0"→"0.8"→"1.6"→"2.4"→"3.2"→"4.0". . . , as shown FIG. 8. The memory control circuit 38 detects an integer portion of the V accumulative zooming efficient inputted thereto, to determine a difference from an integer portion detected at the preceding time. In accordance with the difference, source pixel data to be read out of the memory area 32a is specified of its vertical position. In the example of FIG. 8, when a V accumulative zooming coefficient "1.6" is inputted, the difference in integer portion is "1". Accordingly, a memory control circuit 38 lowers a readout position by 1 line so as to read out the pixel data on 2nd and 3rd lines.

Figure 18:
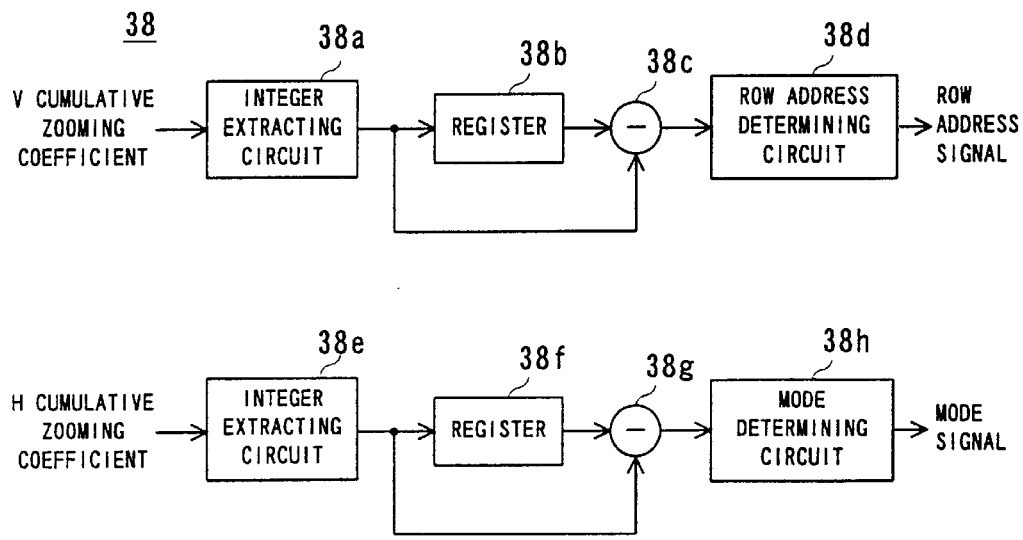
FIG. 18 is a block diagram showing part of a memory control circuit.
Figure 19:
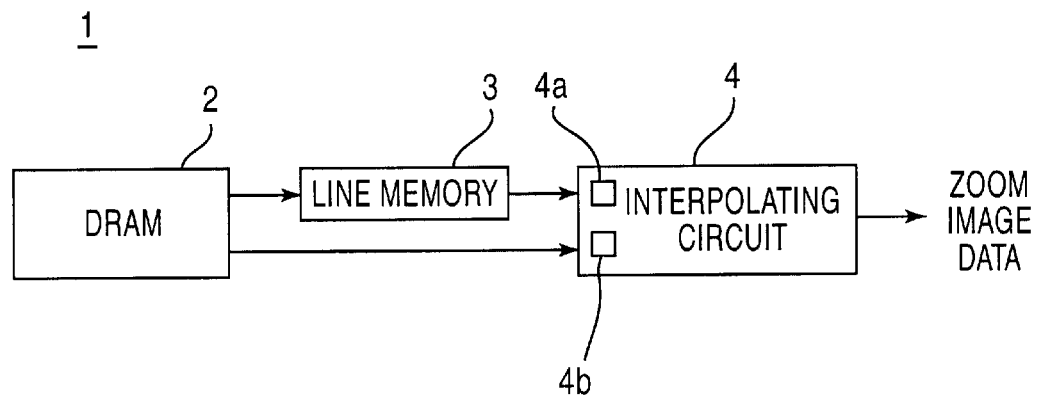
FIG. 19 is a block diagram showing a prior art.

Explanations will be made on an operation to determine a readout position based on a V accumulative zooming coefficient, with reference to FIG. 18. The V accumulative zooming coefficient outputted from the first coefficient calculating circuit 46 is supplied to an integer extracting circuit 38a provided in the memory control circuit 38. This extracts an integer portion of the V accumulative coefficient. The extracted integer is inputted to a subtracter 38c directly and through a register 38b so that the subtracter 38c calculates a difference between them. That is, the subtracter 38c is simultaneously inputted with an integer (preceding integer) extracted in the preceding time and an integer (current integer) extracted this time so as to perform subtraction of the previous integer from the current integer. A row-address determining circuit 38d determines a row address of the memory area 32a, that is, a vertical readout position. That is, the row-address determining circuit 38d adds the difference calculated by the subtracter 38c to the current readout position to provide an additional result for a next readout position. For example, if the current readout position is "15" with the difference "1", then the next readout position is renewed to "16". As a result, the pixel data on a 16-th line and a 17-th line are readout of the memory area 32a.

The 2 lines thus specified contain source pixel data (specified source pixel data) required for creating one zooming pixel. Meanwhile, a reference clock rate is at 15 MHz. Therefore, the memory control circuit 38 reads out source pixel data, i.e. YUV data, from the specified 2 lines at a clock rate of 30 MHz corresponding to twice the reference clock, to write them into the memory areas 40a and 40b of the SRAM 40. Since the SRAM 40 can be accessed only by a word unit, the memory control circuit 38 reads out pixel data on a word-by-word basis from the specified 2 lines so that the data is written to the SRAM 40. Specifically, when the memory control circuit 38 continuously reads out 80 pixels or 30 words of YUV data from a first line, it repeats the same operation on the next line. If the pixel data of the first line is written into the memory area 40a, the pixel data of the next line is written to the memory area 40b. The memory areas 40a and 40b each have a memory capacity of 96 pixels or 32 words so that they have a margin of 16 pixels for the number of pixels "80" written at one time. The pixel data is renewed in a loop manner within each memory area. Therefore, even if the preceding image data took a time to read out and a renewal is made for the pixel data before completing the reading out, all the preceding data can be read out.

The memory control circuit 38 reads out 8 pixels or 3 words of Y, U and V data out of the memory areas 40a and 40b over a period of 3 clocks at a clock rate of 30 MHz to write the same data into memory areas 56a, 56b, 56f and 56g formed in a first register shown in FIG. 10. That is, the memory areas 40a and 40b of the SRAM 40 respectively hold the preceding-line pixel data and current-line pixel data. The data $Y_0$–$Y_7$ of the preceding line are written into the memory area 56a, while the data $Y_0$–$Y_7$ of the current line are into the memory area 56f. Meanwhile, the data $U_1$, $V_2$, $U_5$ and $V_6$ of the preceding line are written into the memory area 56b, while the data $U_1$, $V_2$, $U_5$ and $V_6$ are into the memory area 56g. Incidentally, the preceding-line and current-line data $U_5$ and $V_6$ are also written to the memory areas 56c and 56h.

When the 8-pixel Y, U and V data of the preceding and current lines are held in the first register 56 in this manner, the memory control circuit 38 reads out pixel data from the memory areas 56a–56c and 56f–56h at the reference clock rate, i.e. a clock rate of 15 MHz. The selectors 56d, 56e, 56i and 56j select desired YUV data according to a mode signal outputted responsive to the 15-MHz reference clock from the memory control circuit 38. Referring to FIG. 11, the selectors 56d and 56i each select $Y_0$–$Y_7$ in respective modes 0–7. Also, the selectors 56e and 56j outputs $U_1$ and $V_2$ in the modes 0–4, and selects $U_5$ and $V_6$ in the modes 4–7. That is, the selectors 56d, 56e, 56i and 56j, any mode, simultaneously select the pixel data required for vertical interpolation stated later. Incidentally, the YUV data is renewed on every word by the memory control circuit 38 when the mode shifts from "3" to "4".

In the first coefficient calculating circuit 46 shown in FIG. 7, the H zooming coefficient outputted from the system controller 48 is supplied to an adder 46d with an initial value given to the selector 46e. This initial value assumes "0.0" at an odd field similarly to the above, and a half value of the H zooming coefficient at an even field. Accordingly, when the zooming magnification is at "2.5", the adder 46d is given with an H zooming coefficient of "0.4". The initial value becomes "0.0" at an odd field, and "0.2" at an even field. A selector 46e selects an initial value at the beginning in predetermined timing corresponding to the H zooming coefficient, while it selects an output of the adder 46d during the period other than that timing. The output of the selector 46e is delayed by a predetermined period corresponding to the H zooming coefficient by a delaying circuit 46f so that the delaying circuit 46f has an output supplied as an H accumulative zooming coefficient to the memory control circuit 38. The output is also fed back to the adder 46d. Explaining in greater detail using FIG. 9, the H accumulative zooming coefficient varies as "0.0"→"0.4"→"0.8"→"1.2"→"1.6"→"2.0" . . . in this order at an odd field, for example.

The memory control circuit 48 determines a mode based on the H accumulative zooming coefficient from the first coefficient calculating circuit 46, in this manner. Specifically, the memory control circuit 38 advances the mode by a difference from the preceding-time integer portion of the H accumulative zooming coefficient. In an example of FIG. 9, when the H accumulative zooming coefficients "1.2", "2.01", "3.2" and "4.0" are outputted, the difference from the preceding time is "1" and hence the mode is advanced by that value. Incidentally, when the mode 7 is reached, then the mode returns to 0. In this manner, mode setting is made at the clock rate 15 MHz and the Y, U and V data of the preceding and current lines are simultaneously outputted in either mode shown in FIG. 11(C). That is, the vertical two pixels of the YUV data contained in the source image data are simultaneously outputted.

The operation of determining a mode based on the H accumulative zooming coefficient is nearly similar to the operation of determining a column address based on the V accumulative zooming coefficient. Referring to FIG. 18, the integer portion of the H accumulative zooming coefficient is extracted by an integer extracting circuit 38e so that the extracted integer is inputted to a subtracter 38g directly and through a register 38f. The subtracter 38g calculates a difference between them so that a mode determining circuit 38h determines a mode depending upon this difference. That is, the mode determining circuit 38h adds the difference calculated by the subtracter 38g to the current mode to thereby provide an additional result as a next readout position. For example, if the current mode is "3" and the difference is "1", then the next mode is updated to "4".

The Y, U and V data of the preceding line are respectively supplied to K-times circuits 58a–58c of the H/V interpolating circuit 58, while the Y, U and V data of the current line are respectively supplied to (1−K)-times circuits 58d–58f. Here, the coefficient K corresponds to a decimal portion of the V accumulative zooming coefficient calculated by the first coefficient calculating circuit 46. In this manner, the preceding-line Y data and the current-line Y data, weighted by the coefficient K, are added together by the adder 58g, completing the vertical interpolation. Meanwhile, the U data and the V data are respectively added by the adders 58h and 58i.

Referring to FIG. 8, when a V accumulative zooming coefficient of for example "1.6" is obtained, the preceding-line Y, U and V data are multiplied by 0.4 and the current-line Y, U and V data are multiplied by 0.6, thereby providing Y, U and V data vertically interpolated at a position corresponding to "1.6" in FIG. 8.

The Y, U and V data respectively outputted by the adders 58g–58i are inputted to L-times circuit 58p–58r through registers 58k, 58m and 58n, and directly to (1−L)-times circuit 58s–58u. Here, the coefficient "L" corresponds to a decimal portion of the H accumulative zooming coefficient obtained at the first coefficient calculating circuit 46. The provision of the registers 58k, 58m and 58n enables simultaneous inputting of the horizontal preceding-pixel Y, U and V data and current-pixel Y, U and V data to the adders 58v–58x, thereby completing the horizontal interpolation.

The Y, U and V data created through the vertical and horizontal interpolations, i.e., the zooming pixel data, are supplied through a switch 64 to the image processing circuit 66 where these data are subjected two processes such as aperture, white clip, etc, and then outputted through the monitor 68. That is, zoom image data magnified at a desired zoom magnification is available on the monitor 68. Incidentally, the switch 64 is controlled by the system controller 48 so that the switch 64 is connected to the H/V interpolating circuit 58 when a motion image is outputted through the monitor 68.

In this manner, the H/V interpolating circuit 58 creates zoom image data based on the pixel data of the vertical two pixels and the horizontal two pixels. In order to simultaneously obtain two-line image data out of the SRAM 40, the two-line memory areas 40a and 40b are provided. Meanwhile, only one-line pixel data can be read out of the memory area 32a of the DRAM 32 at one time, the clock rate for reading from the memory area 32a is set at twice the clock rate of reading from the first register 56. That is, the SRAM 40 is provided with a memory area corresponding in capacity to the number of vertical pixels of the source pixels (particular source pixels) required to obtain one zoom pixel so that the readout clock rate from the DRAM 32 is at a value of the reference clock rate multiplied by the number of vertical pixels. Due to this, the memory areas 40a and 40b are reduced in memory capacity to 1 line or less.

when a shutter button is depressed by an operator, the system controller 48 controls the CCD imager 16 to perform so-called all pixel readout. This causes the CCD imager 16 to output pixel signals on every line. The CCD imager 16 is mounted with a color filter 14 shown in FIG. 2, so that it outputs $C_y$ and $I_e$ alternately at an odd line and $M_g$ and G alternately at an even line. The CDS/AGC circuit 18 performs noise removal and level adjustment on the pixel signal similarly to the above so that the A/D inverter 20 converts the pixel signal from the CDS/AGC circuit 18 into digital data or pixel data The CCD imager 16 after outputting 1 frame of pixel signals are disabled, and 1-frame pixel data created by the A/D converter 20 is delivered directly onto the bus 24 without being processed by the first signal processing circuit 22.

The 1-frame pixel data i.e. still-picture data, obtained upon depression of the shutter button 50 is supplied to the 30-bit forming circuit 28 where 1-word data is formed by horizontal 3 pixel data. That is, the $C_y$, $Y_e$, $M_g$ and G pixel data each have a data amount of 10 bits. As shown in FIG. 13, the horizontally continuous 3 pixels of the pixel data are gathered into one, thereby providing a 1-word data. Note that, since the data amount of 1-word is 32 bits, the remaining 2 bits are vacant data. The word data thus created is written into the memory area 32a of the DRAM 32 by the memory control circuit 38, as shown in FIG. 5. The vertical length of 1-word is a 1-line width of the memory area 32a.

The CPU 34 converts the pixel data in the memory area 32a into Y (=$Y_L$), U and V data by using the work area 32b and according to Equation 3–Equation 5. The CPU 34 also compresses the converted Y, U and V data according to the JPEG format, and writes the compressed data into the flash memory 36.

$$Y_h = C_Y + Y_e + M_g + G$$

$$C_b = (C_Y + M_g) - (Y_e + G)$$

$$C_r = (Y_e + M_g) - (C_y + G) \quad \text{[Equation 3]}$$

$$R = k_{11} \times Y_h + k_{12} \times C_b + k_{13} \times C_r$$

$$G = k_{21} \times Y_h + k_{22} \times C_b + k_{23} \times C_r$$

$$B = k_{31} \times Y_h + k_{32} \times C_b + k_{33} \times C_r \quad \text{[Equation 4]}$$

$$Y_L = 0.299 \times R + 0.587 \times G + 0.114 \times B$$

$$U = B - Y_L$$

$$V = R - Y_L \quad \text{[Equation 5]}$$

On the other hand, the memory control circuit 38 read out 80-pixel data line by line from each of the particular 2 lines of the memory area 32a based on a V accumulative zooming coefficient from the first coefficient calculating circuit 46, similarly to the above, and writes them into the memory areas 40a and 40b of the SRAM 40. Due to this, $C_y$, $Y_e$, $M_g$ and G are written in, as shown in FIG. 14(A). Incidentally, when the pixel data are written into the memory areas 40a and 40b, these pixel data each have any of color components $C_y$, $Y_e$, $M_g$ and G.

Figure 15:
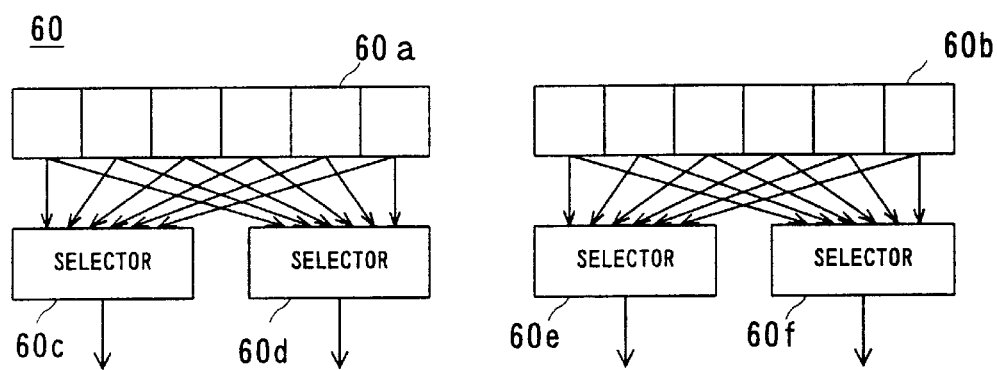
FIG. 15 is a block diagram showing the second register.

When the shutter button 50 is depressed, the memory control circuit 58 writes the pixel data of the SRAM 40 into a second register 60. As shown in FIG. 15, the second register 60 includes 6-pixel memory areas 60a and 60b. The memory control circuit 38 writes the preceding-line pixel data read out of the memory area 40a of the SRAM 40 into a memory area 60a, and writes the current-line pixel data read out of the memory area 40b into a memory area 60b.

Since data reading from the SRAM 40 is possible only on a 1-word unit, the pixel data held in the memory areas 40*a* and 40*b* as shown in FIG. 14(A) are written, by 3 pixels at one time, into the memory areas 60*a* and 60*b* at a clock rate of 30 MHz.

The memory control circuit 38 sets a mode of selectors 60*c*–60*f* based on the H accumulative zooming coefficient from first coefficient calculating circuit 46. Accordingly, the selectors 60*c*–60*f* as shown in FIG. 14(B), select 4 pixel data corresponding to the mode from the memory areas 60*a* and 60*b*. Incidentally, the memory control circuit 38 advances the mode according to the difference from the preceding-time integer portion of the H accumulative zooming efficient outputted from the first coefficient calculating circuit 46, and returns the mode to 0 next to a mode 5. The memory control circuit 38 also causes the second register 60 to output desired pixel data at a clock rate of 15 MHz.

Accordingly, a color-separating/YUV-converting circuit 62 is simultaneously inputted by four pixel data of $C_y$, $Y_e$, $M_g$ and G corresponding to the mode as shown in FIG. 14(C) so that it performs color separation based on these four pixel data and according to Equation 3 and Equation 4, and then YUV-converts the R, G and B data obtained by the color separation according to Equation 5.

The Y, U and V data outputted from the color-separating/YUV-converting circuit 62 are supplied to the switch 64 to the image processing circuit 60 so that a still picture (freeze picture) having a desired zoom magnification is finally outputted through the monitor 68. That is, if an operator depresses the shutter button 50 when a motion picture is being displayed at a desired magnification on the monitor 68, a 1-times still picture data is stored in the DRAM 32 so that a zoom process is performed on the same still picture data. This displays a still picture having the same zoom magnification as the motion picture on the monitor 68. Incidentally, the system controller 48 connects the switch 64 on a side of the color-separating/YUV-converting circuit 62 only upon outputting a freeze picture, and to a side of the H/V interpolating circuit 58 during a period other than the same outputting.

In this manner, since "2" vertical pixels are required for creating one zoom pixel upon outputting a freeze picture through the monitor 68, the SRAM 40 requires 2 lines of memory areas 40*a* and 40*b*. Further, only 1 line of pixel data can be read out of the DRAM 32 at one time, there is a necessity that the clock rate for reading from the DRAM 32 is to be determined twice the clock rate of reading from the second register 60. The setting of the number of memory areas and the clock rate for the SRAM 40 like this makes it possible to reduce the number of horizontal pixels of the memory areas 40*a* and 40*b* less than the number of horizontal pixels of 1 line.

When the image data recorded on the flash memory 36 is displayed at a desired zoom magnification on the monitor 68, the CPU 34 causes the image data to be magnified. That is, the CPU 34 reads compressed data out of the flash memory 36 to expand the compressed data with using a working area 32*b* of the DRAM 32 and magnifies the expanded Y, U and V data with using the same working area 32*b*. The magnified Y, U and V data are converted into 4:1:1 by the pixel mixing circuit 30. The converted Y, U and V data are arranged on a 1-word basis so that the data thus arranged are stored word by word into the memory area 32*a*. Thereafter, the memory control circuit 38 causes desired 2 lines of pixel data to be held in the SRAM 40 based on the V accumulative zooming coefficient so that the pixel data transferred from the SRAM to the first register 56 is read out based on the H accumulative zooming coefficient by the memory control circuit 38. Note that, since the image data having desired zoom magnification is already written in the memory area 32*a*, the H zooming coefficient is "1.0" and the V zooming coefficient is "2.0".

The pixel data read out of the first register 56 is then subjected to vertical and horizontal interpolations by the H/V interpolating circuit 58. Desired zoom magnification of zoom image data is finally outputted through the monitor 68.

If the operator manipulates a mode-selecting button 52 to select a continuous shoot mode when a motion picture is being displayed on the monitor, image data is processed so as to output 4 still pictures having predetermined time differences through the monitor 64, as stated below. That is, the Y, U and V data obtained from the first signal processing circuit 22 are subjected to vertical interpolation with using one line memory 22*a* obtained in the first signal processing circuit. The Y, U and V data obtained by the vertical interpolation are further subjected to horizontal interpolation by the H interpolating circuit 26. At this time, the V accumulative zooming coefficient used for the vertical interpolation by the first signal processing circuit 22 and the H accumulative zooming coefficient for the horizontal interpolation by the H interpolating circuit 26 are created by a second coefficient calculating circuit 44 having the same structure as the first coefficient calculating circuit 46. Incidentally, the second efficient calculating circuit 44 is given with a V zooming coefficient "2.0" and an H zooming coefficient "2.0" by the system controller 48.

The still picture data compressed in ¼ like this is arranged into 1-word data by the pixel mixing circuit 30 so that this data is written into the memory area 32*a* of the DRAM 32. That is, the 4 image data compressed in ¼ are written in the memory area 32*a*. The first coefficient calculating circuit 46 is given with a V zooming coefficient "2.0" and an H zooming coefficient "1.0". This provides a V accumulative zooming coefficient based on which the memory control circuit 38 reads pixel data out of predetermined 2 lines, and writes the data into the SRAM 40. Meanwhile, the pixel data written from the SRAM 40 to the first register 56 is read out by the memory control circuit 38 based on the H accumulative zooming coefficient. The read pixel data is utilized for horizontal and vertical interpolations by the H/V interpolating circuit 58. 4 still pictures having determined time difference are finally displayed on the monitor 68.

Incidentally, where displaying 9 still pictures on the monitor 68, there is a necessity to reduce the size of the respective image data to ⅑. Where 16 still pictures are displayed on the monitor 68, the respective image data require reduction in size to 1/16.

Explanations were made so far on an assumption that the number of pixels of the CCD imager 16 and those of the monitor 68 are the same. However, where the number of pixels of the monitor 68 is less than those of the CCD imager 16, there is a necessity of compressing the Y, U and V data obtained from the first signal processing circuit 22 even when displaying a 1-times motion picture. In such a case, horizontally-compressed pixel data is created by the H interpolating circuit 26 before writing the image data to the DRAM 32. After reading the image data from DRAM, horizontally-compressed image data, i.e. H zoom image data, is created by the H/V interpolating circuit 58.

Figure 16:
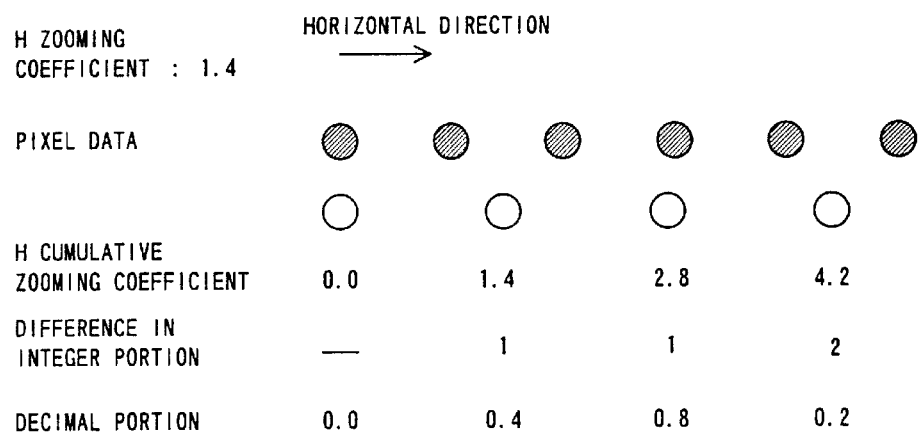
FIG. 16 is an illustrative view showing part of an operation of a second coefficient calculating circuit.

Explaining in greater detail, where the number of pixels of the monitor 68 is 0.7 times the number of pixels of the CCD imager 16, the system controller 48 gives an H zooming efficient "1.4" to the efficient calculating circuit 44. Accordingly, at an odd field the H accumulative zooming coefficients is provided that varies as "0.0"→"1.4"→"2.8"→"4.2". . . as shown in FIG. 16. The decimal portion of the H accumulative zooming coefficients are given to the H interpolating circuit 26. The H interpolating circuit 26 performs horizontal interpolation on the Y, U and V data outputted from the first signal from the circuit 22, depending upon the decimal portion inputted thereto. In this manner, the horizontally-compressed Y, U and V data are converted into 4:1:1 by the pixel mixing circuit 30, and arranged into a 1-word configuration. The arranged data is stored in the memory area 32a of the DRAM 32.

Figure 17:
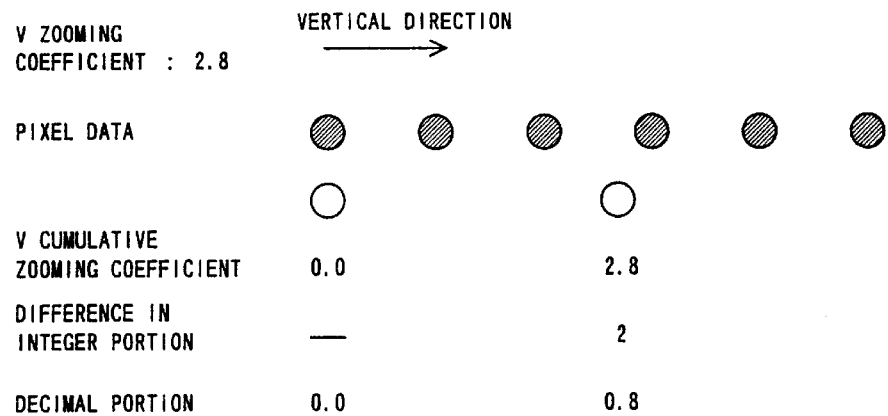
FIG. 17 is an illustrative view showing part of an operation of the first coefficient calculating circuit.

On the other hand, the system controller 48 gives a V zooming coefficient "2.8" and an H zooming coefficient "1.0" to the first coefficient calculating circuit 46. That is, since the monitor 68 outputs zoom image data by an interlace scheme, the V zooming coefficient is set twice the H zooming coefficient "1.4" given to the second coefficient calculating circuit 44. The H zooming coefficient is set to "1.0" because it has already completed of horizontal interpolation by the H interpolating circuit 26. Due to this, the V accumulative zooming efficient outputted from the first coefficient calculating circuit varies as "0.0"→"2.8". . . as shown in FIG. 17.

The memory control circuit 38 detects a difference from a integer portion of the preceding V accumulative zooming coefficient so as to advance the line of the DRAM 32 by the difference amount. The 2 lines of pixel data held in the SRAM 40 is supplied through the first register 56 to the H/V interpolating circuit 58 where it is vertically interpolated depending upon the decimal portion of the V accumulative zooming coefficient from the first coefficient calculating circuit 46. This provides vertically-compressed image data. That is, zoom image data is obtained which is compressed in the horizontal direction by H interpolating circuit 26 and compressed in the vertical direction by the H/V interpolating circuit 58 to have a same number of pixels as the monitor 68.

Incidentally, the pixel data written in the SRAM 40 was once transferred to the first register 56 because the writing-in/reading-out the SRAM 40 is possible only on a 1-word (=32 bits) basis and accordingly color separation and interpolation is impossible only by the SRAM 40.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera which creates zoom image data having a desired zoom magnification, comprising:
   an imager for imaging an object;
   a video memory for holding source image data corresponding to an object image obtained by said imager;
   a buffer having at least a first capacity corresponding to a data amount of particular source pixels required to create one zoom pixel;
   a transferor for transferring from said video memory to said buffer, pixel data containing the particular source pixels at a high speed clock rate;
   a reader for reading the pixel data held in said buffer at a reference clock rate slower than said high speed clock rate; and
   a creator for creating pixel data for the zoom pixel based on an output of said buffer, wherein the particular source pixels include a plurality of pixels in a vertical direction, said high speed clock rate is a rate multiplying said reference clock rate by the number of vertical pixels or more of the particular source pixels, said imager outputs the source image data in a luster scan manner, said transfer or transfers the pixel data in a special scan manner different from the luster scan manner, and said reader reads the pixel data in a manner by which the zoom image data is created in the luster scan manner.

2. A digital camera according to claim 1, further comprising:
   a first summer for summing up vertical zooming coefficients related to the zoom magnification, wherein
      said transfer or includes a first determiner for determining a readout position in a vertical direction of said video memory based on a first summing result by said first summer.

3. A digital camera according to claim 2, wherein said first determiner includes a first integer extractor for extracting a first integer from the first summing result, a first difference detector for detecting a first difference between the first integer at a preceding time and the first integer at a current time each of which is extracted by said first integer extractor, and a first readout position update for updating the readout position in the vertical direction according to the first difference.

4. A digital camera according to claim 1, wherein
   said buffer includes an SRAM having at least the first capacity and accessed by a word unit, and a register for holding a predetermined number of words of pixel data read out of said SRAM.

5. A digital camera according to claim 4, wherein
   said buffer further includes a pixel selector for simultaneously selecting the pixel data contained in the vertical direction of the particular source pixels from the pixels data held in said register.

6. A digital camera according to claim 5, further comprising:
   a second summer for summing up horizontal zooming coefficients related to the zooming magnification, wherein
      said reader further includes a selective controller for controlling said pixel selector based on a second summing result by said second summer.

7. A digital camera according to claim 6, wherein
   said selective controller includes a second integer extractor for extracting a second integer from the second summing result, a second difference detector for detecting a second difference between the second integer at a preceding time and the second integer at a current time each of which is extracted by said second integer extractor, and a selective switcher for switching a selective operation of said pixel selector according to the second difference.

8. A digital camera according to claim 6, further comprising:
   a memory for outputting the zoom image data by an interlace scan method, wherein said horizontal zooming coefficient is ½ of the vertical zooming coefficient.

9. A digital camera according to claim 1, wherein
   said creator includes a vertical interpolator for performing vertical interpolation on the pixel data contained in the vertical direction of the particular source pixels, and a horizontal interpolator for performing horizontal interpolation on the pixel data contained in a horizontal direction of the particular source pixels.

10. A digital camera according to claim 9, wherein each pixel contained in the source image data possesses a Y component, a U component and a V component.

11. A digital camera according to claim 4, wherein said creator includes a color separator for performing color separation on the pixel data contained in the vertical direction of the particular source pixels.

12. A digital camera according to claim 1, wherein each pixel contained in the source image data possesses any one of a Ye component, a Cy component, an Ig component and G component.

\* \* \* \* \*